(12) United States Patent
Beard

(10) Patent No.: US 11,423,487 B1
(45) Date of Patent: Aug. 23, 2022

(54) DYNAMIC ASSIGNMENT OF PERSONNEL TO LOCATION-BASED ASSIGNMENTS

(71) Applicant: Debra Beard, Hooks, TX (US)

(72) Inventor: Debra Beard, Hooks, TX (US)

( * ) Notice: Subject to any disclaimer, the term of this patent is extended or adjusted under 35 U.S.C. 154(b) by 96 days.

(21) Appl. No.: 15/890,614

(22) Filed: Feb. 7, 2018

Related U.S. Application Data

(60) Provisional application No. 62/473,849, filed on Mar. 20, 2017.

(51) Int. Cl.
  *G06Q 40/00* (2012.01)
  *G06Q 40/08* (2012.01)
  *G06Q 10/06* (2012.01)

(52) U.S. Cl.
  CPC ..... *G06Q 40/08* (2013.01); *G06Q 10/063112* (2013.01)

(58) Field of Classification Search
  USPC .......... 705/4, 2, 3, 38, 39, 40; 235/380, 375
  See application file for complete search history.

(56) References Cited

U.S. PATENT DOCUMENTS

| | | | | | |
|---|---|---|---|---|---|
| 5,950,169 | A | * | 9/1999 | Borghesi | G06Q 40/08 715/733 |
| 7,953,615 | B2 | * | 5/2011 | Aquila | G06Q 40/08 705/2 |
| 2004/0225535 | A1 | * | 11/2004 | Bond, Jr. | G06Q 40/02 705/4 |
| 2013/0035964 | A1 | * | 2/2013 | Roscoe | G06Q 40/08 705/4 |
| 2013/0204645 | A1 | * | 8/2013 | Lehman | G06Q 40/08 705/4 |
| 2017/0078859 | A1 | * | 3/2017 | Kendrick | G06Q 40/08 |

OTHER PUBLICATIONS

Workflow and application adaptations in mobile environments; Proceedings WMCSA'99. Second IEEE Workshop on Mobile Computing Systems and Applications (pp. 62-69); Jing, J.; Huff, K.; Sinha, H.; Hurwitz, B.; Robinson, B.; Feb. 25, 1999. (Year: 1999).*
A reliability insurance scheme for the electricity distribution grid; 2001 Power Engineering Society Summer Meeting. Conference Proceedings (Cat. No. 01CH37262) (vol. 1, pp. 261-266 vol.1); E. Fumagalli, J.W. Black, M. Ilic, I. Vogelsang; Jan. 1, 2001. (Year: 2001).*

* cited by examiner

*Primary Examiner* — Tien C Nguyen
(74) *Attorney, Agent, or Firm* — Fish & Richardson P.C.

(57) ABSTRACT

The present disclosure describes, in one implementation, an assignment for an insurance claim of a loss is identified, the assignment specifying a loss location. A first set of candidate user profiles are searched for from a plurality of profiles, where each profile in the plurality of user profiles corresponds to a particular insurance adjuster and at least one associated device. Searching can include determining that a location associated with a particular device is within a first search range of the loss location, and identifying the profile corresponding to the device as one of the first set of candidate user profiles. An assignment notification is transmitted to each of the devices associated with the first set of candidate user profiles. Upon receiving a response to the assignment notification from a device associated with a profile, the assignment is assigned to the first insurance adjuster associated with the profile.

20 Claims, 5 Drawing Sheets

DYNAMIC ASSIGNMENT OF PERSONNEL TO LOCATION-BASED ASSIGNMENTS

This present disclosure claims the benefit of the priority of U.S. Provisional Application Ser. No. 62/473,849, filed on Mar. 20, 2017, entitled "APP-UTILIZATION PROCESS TO LOCATE, FILTER, AND SOURCE ADJUSTERS AND OTHER LICENSED INSURANCE INDUSTRY PROFESSIONALS." The entire contents of which are hereby incorporated by reference.

BACKGROUND

An insurance adjuster (also referred to as a claim adjuster or a claim handler) can investigate insurance claims by interviewing the claimant and witnesses, consulting police and hospital records, inspecting property damage, etc., to document and evaluate the extent of an insurance company's liability while handling the claim. Independent adjusters play an important role to insurance providers and their customers by providing temporary and/or long-term claim-handling services in situations when they are more economical than an insurer's salaried employees. Most often, independent adjusters provide a ready response to catastrophic weather events and are deployed to areas where an insurer has a higher-than-usual claim volume. Depending on the extent of damage caused by any type of catastrophe or weather event, it is typically impossible for an insurer's normal staff to field all the insurance claims they receive, especially within the time frames mandated by each state. An insurer (e.g., an insurance company) typically needs an independent adjuster for every 30-80 extra claims and requires more adjusters with each delay. An insurer may need hundreds of adjusters for an average hail-storm or thousands for a larger hurricane. Demand for independent adjusters is usually sudden and very difficult to estimate.

Independent adjusters maintain licenses to work in their home states, but in most cases, they carry licenses from numerous additional states to increase their deployment opportunities nationwide. Most independent adjusters are independent contractors and receive project work through various staffing vendors which function as temporary staffing agencies for insurers. For decades, the industry's current process has allowed insurers to request independent adjusters in bulk from each of their vendors. The vendors go down their rosters of independent adjusters, attempting to contact each one and determining their respective availability, and deploying individual adjusters to particular projects.

SUMMARY

The present disclosure describes assigning insurance adjusters and other personnel for claim-handling and other industry services.

In an implementation, an assignment for an insurance claim of a loss is identified, the assignment specifying a loss location. A first set of candidate user profiles are searched for from a plurality of user profiles, where each user profile in the plurality of user profiles corresponds to a particular insurance adjuster and at least one device associated with the particular insurance adjuster. Searching for the first set of candidate user profiles can include determining that a location associated with the at least one device associated with the particular insurance adjuster is within a first search range of the loss location, and identifying the user profile corresponding to the at least one device having the location within the first search range of the loss location as one of the first set of candidate user profiles. An assignment notification is transmitted to each of the devices associated with the first set of candidate user profiles, such as by using a communications module. In response to receiving a response to the assignment notification from a device associated with a candidate user profile of a first insurance adjuster, the assignment is assigned to the first insurance adjuster.

In some instances, identifying the assignment for a loss can include receiving information about the insurance claim of the loss from an insurance company and creating the assignment for the insurance claim of the loss based on the information about the insurance claim of the loss.

In some instances, searching for a first set of candidate user profiles of insurance adjusters based on the loss location and respective locations of devices associated with the first set of candidate user profiles can include receiving the respective locations of devices associated with the first set of candidate user profiles, identifying respective distances from the loss location to each of the respective locations of devices associated with the first set of candidate user profiles, and determining that the locations of devices associated with the first set of candidate user profiles are within the first search range of the loss location based on the respective distances from the loss location to the each of the respective locations of devices associated with the first set of candidate user profiles. In some of those instances, the respective locations of the devices are determined by receiving location information associated with the devices on a periodic basis. In some instances, the respective locations of the devices are determined by transmitting a request for a current location to the devices and receiving location information associated with the devices in response to the request.

In some instances, the assignment notification specifies a distance from the loss location to a location of each of the devices associated with the first set of candidate user profiles. In other instances, the assignment notification specifies a determined time of arrival at or a determined time to travel to the loss location for each of the devices associated with the first set of candidate user profiles.

In some instances, the assignment specifies an assignment requirement, wherein the assignment requirement comprises one or more of a policy type, a loss type, a required equipment, or a desired type of skill for the loss. In some of those instances, the policy type of or the loss type for the loss comprises one or more of a residential, homeowner's, renter's, rental dwelling, commercial, crop, farm/ranch, condominium master policy, marine, auto, wind, hail, back-up of sewer/drain, flood, fire, hurricane, earthquake, theft, business interruption, collision, or comprehensive. In some instances, searching for a first set of candidate user profiles based on the loss location and respective locations of devices associated with the first set of candidate user profiles can include searching for a second set of candidate user profiles that meet the assignment requirement and searching for, from the second set of candidate user profiles, the first set of candidate user profiles based on the loss location and respective locations of devices associated with the second set of candidate user profiles.

In some instances, receiving, from the device associated with a candidate user profile of a first insurance adjuster, the response to the assignment notification can include receiving, from the device associated with the candidate user profile of the first insurance adjuster, the response to the assignment notification within a predetermined time period. In some instances, in response to determining that no response to the assignment notification has been accepted within a predetermined time period, the first search range can be expanded into a second search range. In those instances, another set of candidate user profiles can be searched for based on the loss location and respective locations of devices associated with the another set of candidate user profiles, wherein the locations of devices associated with the first set of candidate user profiles are within the second search range of the loss location. An assignment notification can then be transmitted to each of the devices associated with the another set of candidate user profiles. In some of those instances, the another set of candidate user profiles can include the first set of candidate user profiles.

Implementations of the described subject matter, including the previously described implementation, can be implemented using a computer-implemented method; a non-transitory, computer-readable medium storing computer-readable instructions to perform the computer-implemented method; and a computer-implemented system including one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described subject matter can simplify the insurance process and improve customer service in the insurance industry, for example, by increasing customer satisfaction and trust in an insurer. Second, the described subject matter can reduce delays in finding independent adjusters and other personnel, determining their availability, and directing them from their current, future, or potential location, as well as any other particular location, to the project site. Third, the described subject matter can perform an effective and flexible assignment of projects among independent adjusters and other personnel, increasing their work opportunities, improving their efficiency, and reducing their costs and stress. Fourth, the described subject matter can reduce the costs of the independent adjusters and other personnel, the insurers, and the insurer's customers. Fifth, the described subject matter can deliver training and other tools to the adjusters and other personnel while they are performing various tasks, thereby increasing their knowledge and skills and improving the quality of their services. Sixth, the described subject matter can facilitate communication between adjusters and other professionals within the industry to share knowledge, answer questions, coordinate services, and foster support. Seventh, the described subject matter can prevent conflicts of interests and preferential claim assignments that are inherent to existing staff and independent assignment models. Eighth, the described subject matter can prevent missed and/or double-booked appointments. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
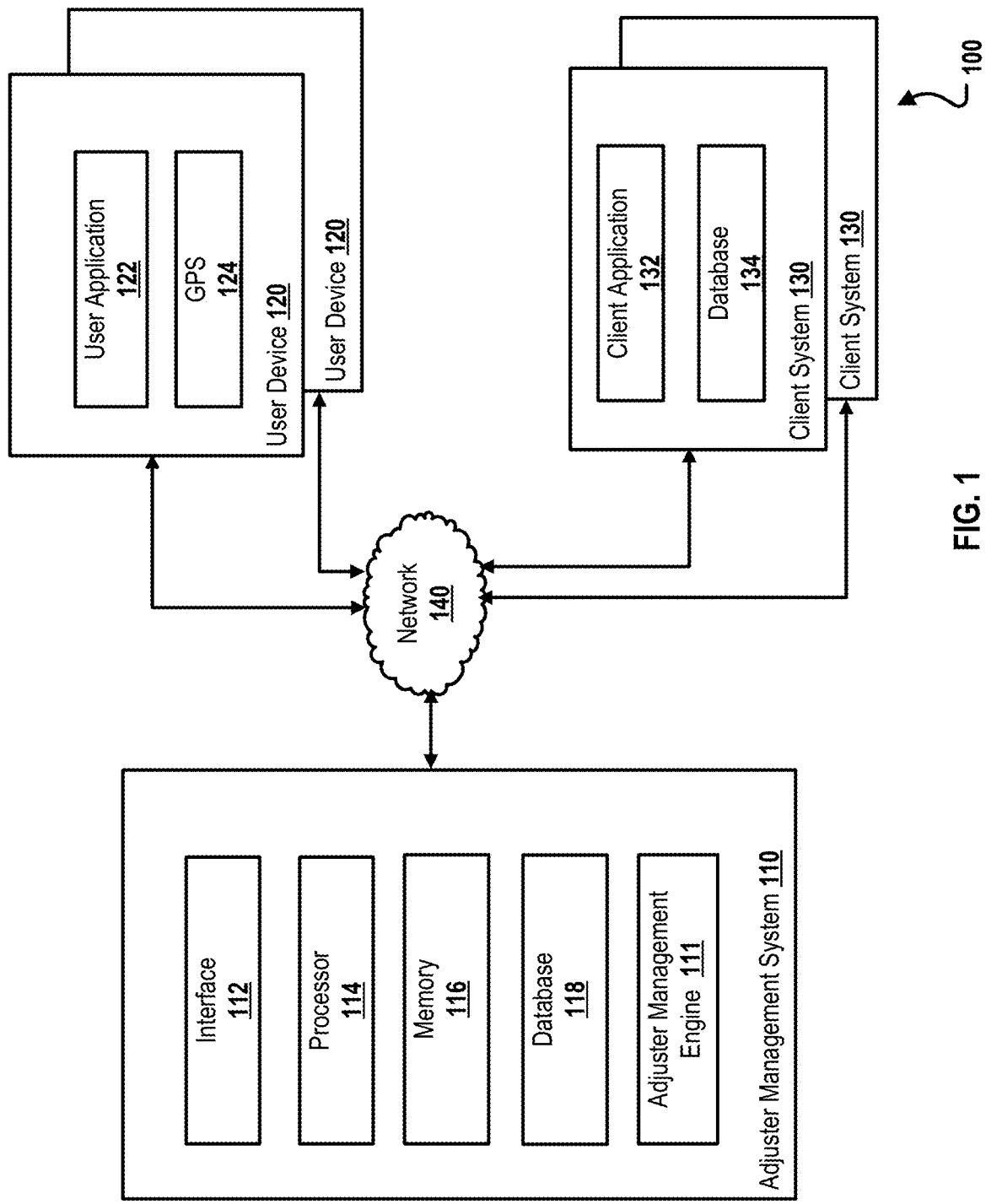
FIG. 1 is a block diagram illustrating an example of a system for assigning insurance adjusters for claim-handling services, according to an implementation of the present disclosure.

Described are example techniques for dynamically assigning insurance adjusters and other personnel for claim-handling industry services based on a contextual analysis of the current claim assignment and the current location, qualifications, and statuses of a plurality of adjusters and personnel. Current solutions of insurance adjuster assignment require a slow process that delays the insurer's claim response for multiple reasons: it typically takes time for adjusters to be selected, another few days for them to arrive, another day or so to brief them on the situation, and another day or so for them to contact their assigned customers and schedule appointments. A substantial percentage of the insurer's customers do not get a chance to speak to the assigned adjuster for several days and they do not see the assigned adjuster for up to several weeks. The described techniques can help resolve and/or reduce these problems by providing more efficient and effective assignment of personnel; this improves insurer response and customer satisfaction. The described techniques can serve as a referral system to process and coordinate claims assignments and other service assignments based on locations and/or skills of available and qualified personnel. For example, an insurance claim is assigned to an available adjuster nearest to a location of a loss. In some implementations, the referral system can function as a third party to the insurance adjusters and insurance companies. In some implementations, the referral system can be used by a particular insurance company to find qualified insurance adjusters specific for or belonging to or associated with the insurance company.

In some implementations, the described techniques can be implemented as an application (e.g., a mobile application or a web client) to monitor (e.g., automatically or manually) the locations, qualifications, and availabilities of insurance adjusters and related personnel in real-time and to deliver potential claim assignments to them. The described techniques can assign insurance adjusters or other personnel one-at-a-time or in bulk for immediate or timely processing of individual claims or an entire project. The described techniques can process and coordinate staging assignments to source and/or congregate personnel in anticipation of a large-scale event or a high volume of assignments. The described subject matter can coordinate and deliver assignment postings for immediate or timely selection and fulfillment by personnel. The described subject matter can allow assignments to individual users one-at-a-time or allow them to collect and maintain inventories of two or more assignments to be handled consecutively, simultaneously, or however optimized. The inventories could be established based on the experience and skill of the user, for instance, to allow more experienced users to maintain increased volumes of assignments while inexperienced users work on one or two at a time. The described techniques can allow more effective claim management and ensure timely or immediate customer service.

In some implementations, the described techniques allow insurance adjusters or other personnel to register their skills and to get offers or assignments from clients or insurance carriers (e.g., an insurance company) based on insurance adjusters' or other personnel's skills and their past, current, or expected location. For example, the described techniques can be implemented as an application (referred to as "AdjusterApp" in this disclosure). The application can be installed on electronic devices of one or more of a user (referred to as user devices) and a client. A user can download a user version of the application (referred to as a user application) to create a user profile and receive claim assignments from the application. In some instances, a web-based site or application may be used to register a user profile in the alternative. A user can include, but is not limited to, an insurance adjuster (also referred to as an adjuster), a trainer, a file reviewer, a ladder assist, or other personnel. A ladder assist is someone whose assignment would be to meet the adjuster at the location of loss and provide specialized equipment to complete the project, such as a longer ladder, a rope and harness, or other suitable tools or assistance. A ladder assist usually shows up and helps the adjuster get on the roof safely. Their assignments usually come from the adjuster, where the adjuster would call in a need for the assist and we would create an assignment manually. However, assignment can work the same way, where an adjuster or other personnel can create or initiate assignments in the software to assist or train the adjuster in a particular assignment. Several roles can be defined with respect to the mobile application. For example, a client can be an insurer (e.g., an insurance company or organization) that has a contract with one or more policyholders (also referred to as the insured). A policyholder can be a client's insurance customer. Policyholders report losses to the client. The client can search for adjusters to handle insurance claims filed by policyholders. For example, the client can use a client version of the application (referred to as a client application) to find the user nearest to a location of loss (also referred to as a loss location). An adjuster can be a user who receives assignments via the user application of the AdjusterApp. The adjuster can meet policyholders, inspect losses, prepare estimates, and settle insurance claims on behalf of the client.

In some implementations, several other roles can be defined with respect to the application. For example, an admin can be an employee of a company or organization who performs management roles for users and corresponds with clients. In some implementations, a company can be a company-aggregator, to which the adjusters and admins belong. In some implementations, the application can be licensed to multiple companies. Each company can have its own admins and users. Multiple companies can coexist with or without interacting with each other. A super admin can be an administrator of the application who has the authority to create, edit, and delete profiles of clients, admins, or users. The super admin can assign users and admins to a company. In some implementations, an admin or super admin can create assignments and specify the client for whom the assignment is created. In some implementations, the system can handle as many users as needed, for example, up to 100,000 active users in the system at once. In some implementations, the system can know the locations and availability statuses of thousands of licensed adjusters at any given moment, and can use that information to identify a set of adjusters to whom an opportunity can be presented in response to a newly input assignment.

FIG. 1 is a block diagram illustrating an example of a system 100 for assigning insurance adjusters for claim-handling services, according to an implementation of the present disclosure. The system 100 includes an adjuster management system 110, one or more user devices 120, and one or more client systems 130. The adjuster management system 110, user devices 120, and client systems 130 are communicatively linked through a network 140. The system 100 can include additional or different components, or be configured in a different manner than shown in FIG. 1. For example, while FIG. 1 shows that the adjuster management system 110 is implemented as a separate system from the user devices 120 and client systems 130, in some implementations, some or all components and functionalities of the adjuster management system 110 can be integrated into the user devices 120 and client systems 130. As a specific implementation, the adjuster management system 110 and the client systems 130 can be integrated together as a single system. Additional or different implementations can be configured.

A user device 120 can be a mobile phone, a tablet, a desktop or laptop computer, a smart device (e.g., a smart watch or fitness device), or another electronic device. The user device 120 can include a user application 122, for example, for the user to receive claim assignments. The user device 120 can include a Global Positioning System (GPS) 124 or another location identification component for identifying a location of the user device 120. The user device 120 can include other components (not shown) such as one or more of an interface, processor, and memory for performing its configured functions. In some implementations, a single user can own, operate, have access to, or be otherwise associated with one or more user devices 120 (e.g., a mobile phone, a tablet, and a PC). The user can log into the user application 122 with any one of his/her associated user devices 120 using his/her credentials. For location purposes in those situations, one or more of the user devices 120 may be identified as a primary device for location purposes. For example, a mobile phone may be considered to be a user device 120 most associated with the current location of a user. However, a tablet or laptop also associated with the user may also provide another point of reference for the user's location. The described system can use a combination of locations of the user devices 120, including how the location of those devices has changed or stayed the same over a period of time, to determine which devices 120 are relevant to the current location of the user. In some implementations, the user device 120 may be the user's vehicle, if equipped with such technology. In such a scenario, the user application 122 may be downloadable independently or as part of a vehicle upgrade package which may or may not include additional features including but not limited to a laptop mount, desk, conferencing functionality, ladder rack(s), positioning system, internet accessibility, Camera docking hardware/software, wardrobe, sleeping bunk/quarters, generator, built-in storage, or other devices, equipment, technology, or specialized parts. In some implementations, the user device 120 and the vehicle of the user and/or other user devices may interact with one another to provide particular functionality and/or user interfaces, where appropriate.

In some implementations, a user (e.g., an insurance adjuster) can download the user application 122 to the user device 120. The user application 122 can be implemented, for example, as a mobile application or a web application. The user can create an account and a user profile. In some implementations, the user profile needs to be submitted for an admin's review/approval. In some implementations, the user needs to agree to an employment agreement with a company. A user can create and update his/her user profile with contact information and skills. In some implementations, from the user application 122, a user can see historical data of some or all assignments he/she accepts/rejects and some or all invoices he/she creates.

Figure 2:
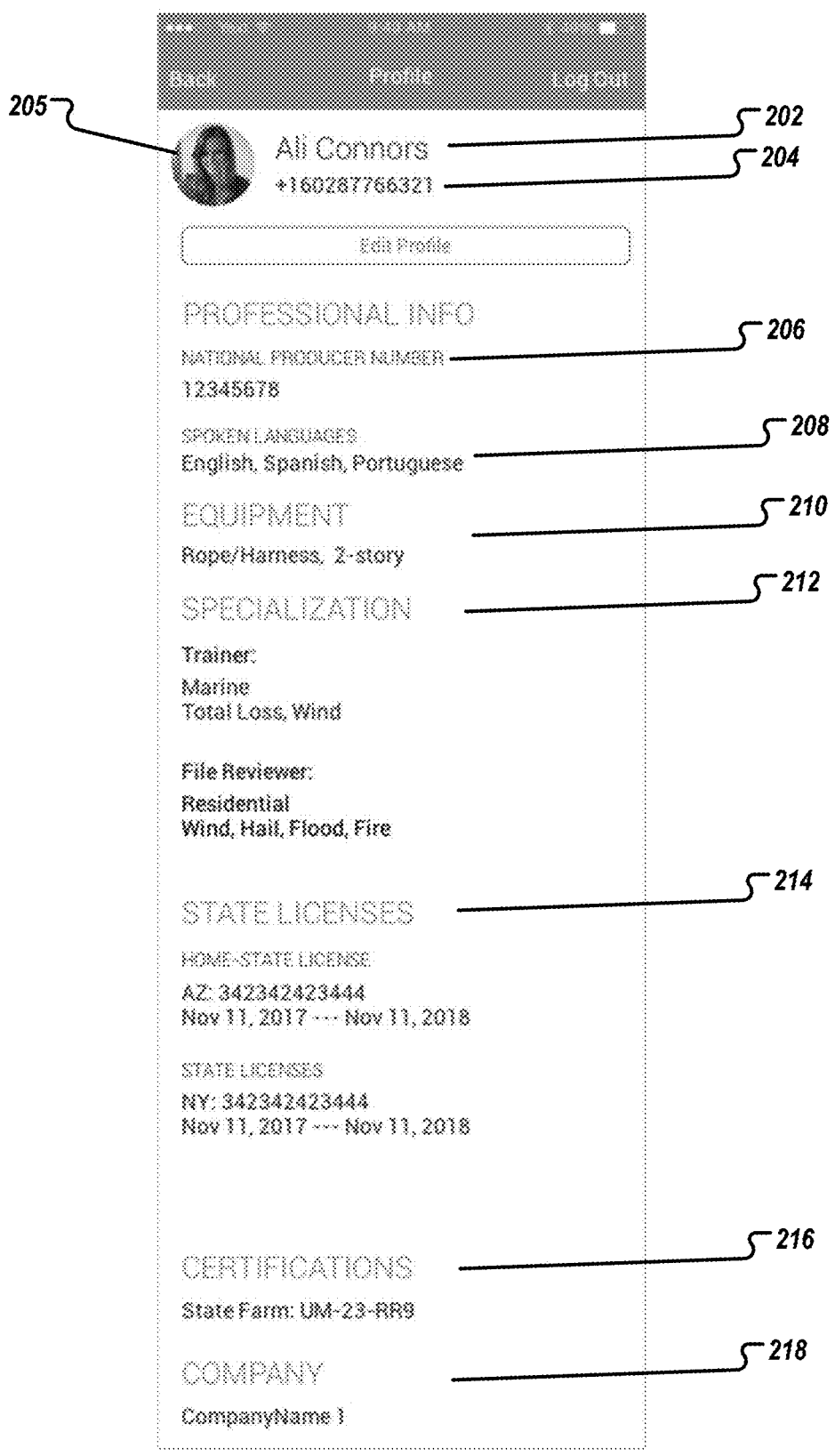
FIG. 2 is a screenshot illustrating an example of a user interface of a user application for creating a user profile, according to an implementation of the present disclosure.

FIG. 2 is a screenshot illustrating an example of a user interface of a user application for creating a user profile 200, according to an implementation of the present disclosure. The example user profile 200 includes contact information of the user. The contact information can include personal information, such as, name 202, phone number 204, and picture or icon 205. The personal information can also include the user's national producer number 206 and one or more state license information (e.g., license number and valid term) 214. The user profile 200 can include skill information of the user. The skill information can include, for example, spoken languages 208, equipment 210 that the user can provide, and specialization(s) 212 as identified by the user and/or verified through one or more external sources or databases. The specialization 212 can include further detailed information such as the user's performer/adjuster types, policy types, and type of loss that the user can handle. The performer/adjuster types can include, for example, adjuster, trainer, file reviewer, and ladder assist. The policy types can include, for example, residential, commercial, farm/ranch, condominium master, flood, marine, and auto. The type of loss can include, for example, wind, hail, flood, fire, hurricane, and earthquake. The equipment can include, for example, 28' ladder, 32' ladder, 40' ladder, rope/harness, drone, robot, remotely controlled vehicles, all-wheel or four-wheel drive vehicle, aircraft, satellite, etc.

The user profile 200 can also include the user's association with one or more clients (e.g., an insurance company or organization). For example, the user profile 200 can include the user's certification 216 issued by one or more clients and the company 218 by which the client is employed or associated. Insurance companies may use a certain form of identifiers for identifying each of their employees and even external associates (e.g., independent adjusters). For instance, a client may issue a certification to a user who meets the client's requirement (e.g., passing a test or exam) and allow the user to work for the client as needed (e.g., during catastrophes). In some implementations, the AdjusterApp can be configured to offer/issue assignments only to users who hold a certification for the client requesting a user. Requests requiring such client certifications can filter out and ignore adjusters without the correct certification. Similarly, any other fields or requirements can be specified as needed or required for a particular assignment, with the system automatically filtering users without those skills or other traits from the potential list of adjusters.

Referring back to FIG. 1, the client system 130 can be a mobile phone, a tablet, a computer, or another electronic device. The client system 130 can include a client application 132 for use by the client, for example, for creating a claim assignment and searching for an adjuster for a claim filed by a policyholder. The client system 130 can be a web application, a mobile application, or another application. The client system 130 can include a database 134 for storing information of policyholders, claims filed by policyholders, adjusters, etc. The client system 130 can include other components (not shown) such as one or more of an interface, processor, and memory for performing its configured functions.

Similar to creating a user profile, a client can create an account and a client profile using the client application 132. The client can have login credentials (e.g., email and password) for accessing the client application 132. In some implementations, each client can have a single set of login credentials that can be shared throughout the client's organization. The login credentials allow access by some or all of the client's employees. In this way, a client may easily be added to or removed from the system. In some implementations, hundreds of client employees may access the system at any given time. In some implementations, a client can create an admin account and grant corresponding authorities to the admin. For example, the admin can manage the users who belong to the client.

In some implementations, a client (e.g., an insurance company) or a client representative (e.g., an employee of an insurance company) logs in with the client's login credential (e.g., email and password) using the client application 132. The client can create an assignment for a claim filed by a policyholder, for example, by entering information into the client application 132 via a web page (e.g., a secure website), a client application, or a mobile application. For example, a client can enter a claim number, loss location, and skills needed to create an assignment and to locate a user to handle the claim.

Figure 3:
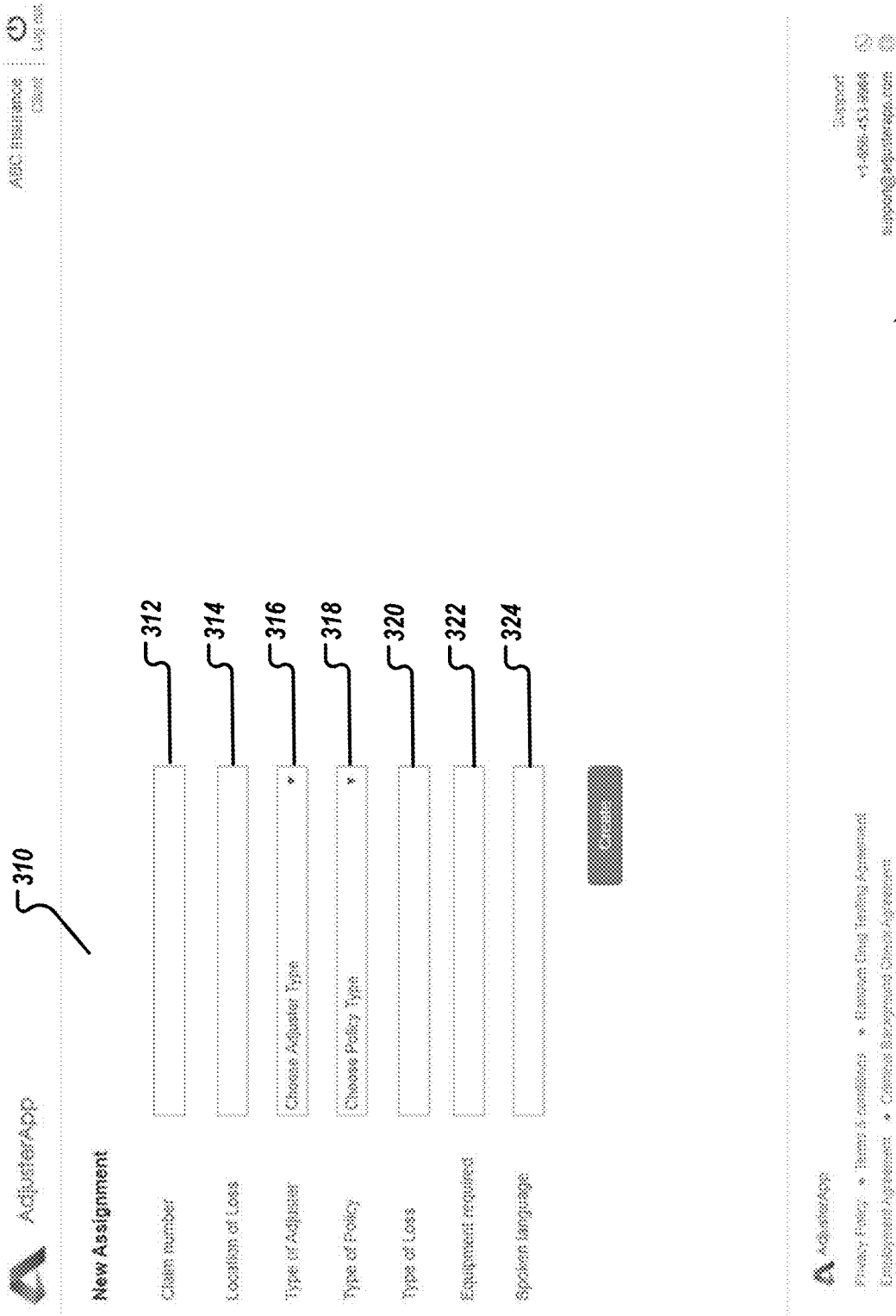
FIG. 3 is a screenshot illustrating an example of a user interface of a client application for creating an assignment of a claim of a loss, according to an implementation of the present disclosure.

FIG. 3 is a screenshot of an example of a user interface 300 of a client application (e.g., the client application 132 of the client system 130) for creating an assignment for a claim of a loss, according to an implementation of the present disclosure. In some implementations, once logged in, the client or the client representative can click a "Create Assignment" icon to create a new assignment. In some implementations, a pop-up window can open with a form 310 to be filled in as shown in FIG. 3. The client representative can type in a claim number 312 and a location of loss 314. The client representative can select a type of adjuster 316, for example, from the choices of adjuster, trainer, file reviewer, ladder assist, etc. In some implementations, the type of adjuster may be labeled as type of user and include other personnel such as any first-responder, engineer, fraud or arson investigation specialists, mitigation services personnel, emergency service personnel, tow truck operators, hazardous material handlers, surveyors, appraisers, code enforcement officers, photographers or data collection personnel, inspection services personnel, public adjusters, contractors, or other vendors who may or may not be required to maintain licensing. The client representative can select a type of policy 318, for example, from the choices of residential, commercial, farm/ranch, condominium master policy, flood, marine, auto, etc. In some implementations, the client representative can select or specify one or more types of adjuster and types of policy. In some implementations, the client representative can specify equipment 322 and language 324 required for the claim assignment.

In some implementations, the client representative can specify one or more types of loss 320, for example, from the choices of wind, hail, back-up of sewer/drain, flood, fire, hurricane, earthquake, theft, collision, comprehensive, etc. For example, the client representative may have an insurance customer on the phone who may not know exactly what caused the loss. In some implementations the client representative or admin can specify one or more types of assignments, such as Fire, Auto, Homeowner's, Residential, Commercial, Field, Catastrophe (sometimes referred to as "Cat"), In-Office, Staff, Employee, Zone, Proximity, Weather, External, Personal Property, or other designation based on the work type, location, environment, claim grouping, or other various categorizations. Allowing multiple options allows the system to find a user who may have experience in handling one or more types of specified losses, thus ensuring an assignment to the most qualified user. In some implementations, the system also allows a user to determine/confirm the cause of loss (it is typically the adjuster's responsibility to identify/confirm the cause of loss) when he/she arrives to complete an inspection. In some implementations, multiple causes of loss occur concurrently. For instance, hurricane Katrina brought flooding to businesses with concurrent looting, which results in an overlap of required skills requiring an adjuster who specializes in flood damage and also theft. As another example, a tornado hits a home and then it catches on fire; a desired adjuster may be specified as someone who is skilled at both types of loss. As such, the system can search for users that meet the requirement and filter out users who do not match the requirement, and thus can assign qualified users to investigate the insurance claims and improve the quality of service provided to the insurance customers.

Referring back to FIG. 1, the adjuster management system 110 can include one or more of an interface 112, processor 114, memory 116, database 118, and an adjuster management engine 111. The interface 112 can include one or more communication interfaces for communication with the one or more user devices 120 and client systems 130 over the network 140. The memory 116 can store instructions executable by the one or more processors 114 for managing users and clients, and assigning claims to available and qualified users. The database 118 can store user profiles, client profiles, claim assignment information, and other data related to claim assignment services. The adjuster management engine 111 is interoperably coupled with the one or more of the interface 112, processor 114, memory 116, and database 118 such that the adjuster management system 110 can function as a backend system supporting functionalities of the user application 122 on the user devices 120 and the client application 132 on the client system 130. For example, the adjuster management system 110 can receive a claim assignment created by the client application 132 on the client systems 130, search for available and qualified users for handling the claim, send an assignment notification to the user devices 120 associated with the available and qualified users, receive an acceptance to the claim assignment from a first user device from the user devices 120 associated with the available and qualified users, assign the claim assignment to the user associated with the first user device, and notify the first user device and the client system 130 about the assignment.

In some implementations, the adjuster management system 110 performs a proximity-based assignment. For example, the adjuster management system 110 can first search any matched users with user devices 120 within an initial radius (e.g., five miles) from the loss location and transmit the assignment notifications to all user devices 120 that are associated with users who match the specified skill requirements and are within five miles of the loss location. If no response is received, the adjuster management system 110 can extend the search a predefined radius, and attempt to transmit assignment notifications to the user devices 120 within the updated radius. In some instances, user devices 120 within the first radius may not receive the second notification. This process can continue indefinitely or until a termination condition (e.g., a maximum radius or maximum number of attempts) is reached.

In some implementations, the adjuster management system 110 initially searches for qualified users that meet the specified skill requirements of the claim assignment (e.g., the type of loss, equipment, spoken language, certification, etc.) based on stored user profiles prior to transmitting the first set of assignment notifications. Once a set of qualified users satisfying the specified skill requirements are identified, the adjuster management system 110 then performs a proximity-based search within the set of qualified users based on respective locations of the set of qualified users. In some instances, such a two-step search can be more efficient because it uses static data about skills and then uses dynamic/changing data with respect to locations. Further, the pool of potential adjusters is limited to those with the correct abilities and skills needed to complete the assignment, thereby avoiding potential inadequate adjusters from accepting a particular assignment.

In some implementations, the adjuster management system 110 can impose further conditions in searching for qualified users. For example, the users can be ranked based on one or more criteria such as, the number of assignments completed, customer satisfaction ratings, number of errors/findings, stars, percentage of availability, percentage of assignments accepted, response speed or time of accepting assignments, years (or other length of time) of experience, and other metrics. In some implementations, an unbiased ranking algorithm is preferred so as to maintain the purpose of referring assignments to the available adjuster in closest proximity to the insurance customer or the location of loss to help the insurance customers as soon as possible and to ensure objectivity when making assignments. In some instances, the adjuster management system 110 may collect rankings related to one or more metrics as evaluated on a subjective or objective scale. The metrics can be applied to or associated with individual adjusters (or other personnel), as well as with clients providing the assignments. Such rankings can be based on user satisfaction (e.g., the client and/or the insurance customer can rate the work of an adjuster after the adjuster has completed an assignment), whether clear instructions were provided for an assignment (e.g., the adjuster can rate clients such as insurance companies as to whether instructions for a particular assignment were clear), whether the instructions provided were followed by an adjuster, whether the assignment was successfully completed, and others. Ratings of a client's customers can also be provided and based on criteria, such as attitude, honesty, and other characteristics. Further, comments, notes, and reviews about specific characteristics of an entity or an interaction with a particular adjuster, client, or customer may be collected. The feedback associated with different persons (e.g., adjusters, customers, etc.) and entities (e.g., assigning entities such as a particular insurance company) can be incorporated into the determination of particular sets of adjusters to be contacted for a particular assignment (e.g., only adjusters above a 3-star average overall may be initially contacted). Information about the assignment provided to those adjusters can include the rating or relative score of the assigning entity, allowing users to determine whether to accept a particular assignment. Using such a system, all parties to the assignment process can provide feedback to the other actors in the system (e.g., an adjuster may be able to rate trainers, ladder assists, etc. and vice versa), as well as evaluate prior feedback those other actors have received from others.

In some implementations, the adjuster management system 110 automatically selects and matches the assignment to qualified users. For example, the adjuster management system 110 automatically recognizes the client by the login credentials and matches the assignments only to potential users who have certifications from the client (i.e., non-certified users are omitted from any assignment notifications). In some implementations, the adjuster management system 110 automatically obtains state information from the loss location entered by the client and matches assignments only to potential users with an active home state license and an active license in the state. In some implementations, the adjuster management system 110 automatically prevents assignments from being sent to users with expired licenses based on the issued/expiration dates entered by the user and verified by personnel (e.g., an admin or super admin). In some implementations, the adjuster management system 110 searches for users only with skills matching those specified by the client. In some implementations, the adjuster management system 110 creates, updates, maintains, deletes, and otherwise manages user profiles and client profiles. In some implementations, the adjuster management system 110 performs invoice processing. The adjuster management system 110 can perform additional or different functions related to claim assignment services.

In some implementations, a user can receive an assignment notification, for example, as a push notification, on the user device 120. In some implementations, the assignment notification can include information such as, the client name and the distance from the user's current location to a to-be-dispatched location (e.g., the loss location). In some implementations, the user sees a countdown of a certain time (e.g., 30 seconds) to accept or decline the assignment. The first user to accept the assignment can be offered or assigned to the assignment. In other instances, the system could search and filter within a particular search radius while retaining all satisfactory acceptances for a period of time (e.g., 30 seconds). The system may then automatically accept the closest user of all who accepted as the assigned user, or may use other criteria or comparisons to identify a particular user from the group of accepting users as the assigned user. Other variations and selection techniques can be applied.

The adjuster management system 110 (and/or other suitable components within or external to the system 110, including but not limited to those illustrated within system 100) can perform additional analyses of particular location data for users. Algorithms executed by the system 110 can allow trend data to be generated and used to identify potential migration trajectories of users. The potential migration trajectory data can provide insight to about particular users' movements to locations where they anticipate potential assignments. If the system 110 identifies trend data for hundreds or thousands of users who are migrating in a particular period of time, such information can be used to confirm that support for large scale or multiple jobs (e.g., in a natural disaster) can be supported by adjusters associated with the system. Additionally, if high claim volumes are expected in a particular location, but the system 110 is not identifying or otherwise determining sufficient migration data, the system 110 can send notifications (e.g., pings) and/or provide a location of interest on the users' individual maps via the user application 122 to initiate or influence user migrations to that area. An example of an algorithm for monitoring trend/location data includes if a user(s) begin traveling across state lines or certain distances toward the direction of a known or expected catastrophe or location of interest.

In some implementations, the assignment notification can include information such as the location of loss and/or the name of the policyholder. However, such information might lead to bias in the assignment selection. For instance, users may not wish to accept assignments from certain neighborhoods, which would cause unfair disadvantages to groups of insurance customers. In some implementations, to promote access equality for the client's insurance customers, only the user's distance from the loss location is visible to the user in the assignment notification. The limited information can prevent the users from having bias or discrimination based on location, region, community, etc. in the selection process that showing the address or customer name/info might present. On the other hand, the displayed information of the distance from the loss location allows the user to know the distance they will be required to travel, and give the choice to accept or pass the assignment. For example, a user may be able to commit to driving five miles at that moment, but 180 miles may not be possible on a moment's notice. Further, in some instances, a time to location, based on distance, travel, and/or traffic data, may be used in lieu of or as a proxy for location. In one example, the assignment process may allow the system 110 to consider the route from each user's location to the loss location. This process would take into consideration such things as the potential acceptors' drive times, estimated time of arrivals (ETAs), traffic conditions, construction, and/or weather along each route, ferries, toll roads, trajectories, and other relevant information. For example, a user could be passing directly by or even be close enough to see a customer's home while driving along a toll road, but may be 45 minutes away if he were to accept an assignment to go to that house. Similarly, a user may be physically close to a loss location, but heading or proceeding in the opposite direction (trajectory). This could bring about another metric whereby a user could indicate a preference for potential assignments based on their heading or such that the system could analyze such data automatically based on trends in their location data.

A user can have one or more possible statuses, such as, "Ready" and "Not Ready" for accepting assignments. In some implementations, a user in the ready status is considered to automatically accept any claim assignment notification sent to her/him. No response or confirmation is required by the user. As an example, the user can be the qualified user nearest to the loss location. In some implementations, assignment notifications can be sent to a group of matched users. Each of the matched users can see the same 30-second (or other alternative amount of time) countdown with options to "Accept" or "Reject." The first user that accepts the assignment notification, for example, by using the user application 122 to transmit a response to the adjuster management system 110, will receive the assignment. The adjuster management system 110 then notifies the client conducting the search that the assignment has been successfully created, for example, by transmitting a confirmation or acknowledgement to the client application 132. In some implementations, the adjuster management system 110 can transmit information of the user who accepts the assignment to the client application 132. The client application 132 can render a user interface, to show the client representative, that includes the user's information, such as, a photo, name, phone number, state license (e.g., only the one needed for the assignment), and certification with the appropriate client identifier. The adjuster management system 110 can request the client application to update the claim file to reflect the assignment and allow the assigned user to access to the claim, location, and/or client system.

Statuses such as those described above can be set manually by users in the application. In some instances, a user can set certain settings for automatic acceptance. In those instances, the system 110 may be programmed to identify variables and/or data to automatically update the user's status. The status could also be scheduled in advance by the user or based on prior user availability to begin or stop accepting assignment notifications at customized times each day or on selected days. Admins may be able to change a user's status at any time. Admins may also block users from going into ready status for any reason. In some instances, users may only be unblocked by admins. As a safety feature of the user application 122, functionality may exist for admins to log out a user if his/her electronic device is missing or stolen. This function will prevent someone from having access to the user's open application and/or accepting assignments without authorization. In some instances, a user's status upon accepting an assignment may automatically be changed to "Not Ready", and may remove the ability to accept new assignments, or may not allow new assignments to be provided to the user.

In some implementations, if no users accept the assignment or the 30-second countdown expires, the adjuster management system 110 can automatically expand the search radius from five miles to, say, 20 miles to search for matched users. The adjuster management system 110 can repeat the above process for one or more next search radii, say, a 50-mile radius and a 200 mile radius each with 30-second countdowns. In some implementations, the client can also see the countdowns and/or messages such as "Searching within 5 miles" from the client application 132, while the adjuster management system 110 actively searches for matched users.

In some implementations, if the adjuster management system 110 fails to find an available user for an assignment, the adjuster management system 110 will notify the client. In some implementations, if the adjuster management system 110 does not find any matched users in a first search radius, it can automatically skip to the next search radius. This way, the assignment process never takes more than 120 seconds and searches within 200 miles, if needed. In the above-described example, the users within five miles of the loss location can receive up to four opportunities to accept the assignment, each with a 30-second time window. The users within 20 miles but outside five miles from the loss location can receive up to three opportunities, etc.

In some implementations, if the adjuster management system 110 fails to find an available user for an assignment, the adjuster management system 110 can provide options for the client to cancel or otherwise withdraw the assignment. In some implementations, if the adjuster management system 110 fails to find an available user for an assignment, the adjuster management system 110 may suggest for the client to adjust their search criteria or try again later. In some implementations, if the adjuster management system 110 fails to find an available user for an assignment, the adjuster management system 110 may post the assignment for any available, nearby user to accept it at their leisure. In some implementations, the adjuster management system 110 may be programmed to forego the searching process and allow assignments to be posted by clients, admins, users, etc. for selection by individuals or groups of users one-at-a-time or in bulk. In some implementations, the adjuster management system 110 can display the assignments on a map. Such display of assignments may be interactive and/or display other relevant information including but not limited to the user's location, trajectory vectors, various routes, a legend, multi-dimensional views, rotational views, topographical information, weather information, traffic information, speed limit information, other data, etc.

In some implementations, the system 110 can facilitate the user to invoice the client for the provided service. Invoices can be generated, for example, based on an invoice questionnaire. The invoice questionnaire can guide the user through a series of questions related to different invoice options. Then, the system 110 can generate a list of billable items. In some implementations, an admin can log into the adjuster management system 110 to review pending invoices for accuracy. In some implementations, an admin can have the authority to modify the listed billable items and add notes about any changes. In some implementations, an admin can delete the billing items, approve, or reject the invoice. If a user's invoice is rejected, the system can allow the user to complete the invoice questionnaire again to correct any mistakes and re-submit for approval. In some implementations, the approved invoice can be analyzed. In some implementations, the pricing can be set or adjusted based on pricing models from each client. In some implementations, only one invoice is created per assignment. In some implementations, multiple assignments may be created with the same claim number. In some implementations, an admin can log in to review/approve/edit user profiles and invoices. In some implementations, fully customized invoice questionnaires can be configured, for example, to provide the user with client-specific questions, client-specific billable items, and client-specific pricing. In some implementations, the invoices may be automatically sent to a client-specific server for processing/payment.

In some implementations, the system 110 can provide interactive features to enhance user experience. For example, the system 110 can configure the client application 132 to render a map to show some or all users simultaneously at their respective locations. The loss location can also be shown in the map. The locations of the users can be collected by the adjuster management system 110 and transmitted to the client system 130. In some implementations, the map is viewable by the client for each assignment created by the client. In some implementations, the map can be updated to track the locations of users in real time. For example, the map can show the location of a user at different stages of a claim assignment process (e.g., offer of assignment, acceptance, en-route, etc.). In some implementations, the map display can be interactive allowing the viewer (e.g., an admin, super admin, or client) to filter and select users based on map location, region, state, etc., or for special notifications, messaging, updates, etc. In some implementations, the map can be zoomed in or out to see users from worldwide or all the way down to a street address. In some instances, the system 110 can include algorithms and calculations to identify user saturation around or within a particular distance or time from the loss location, and can automatically size an ideal search radius for at least the initial search radius. For instance, 30 or more users within a 5 mile radius from a particular loss location may trigger the system 110 and its executing algorithms to reduce the radius from an initial size of 5 miles to an initial size of 3 miles to better optimize the assignment offerings. Conversely, when only 2 users are within a default or standard 5 mile radius from the loss location, the system 110 and its algorithms may automatically increase the radius for an initial offering radius or time to include additional users (e.g., to meet a minimum number of potential users, in some cases). The search radius functionality can be automatic, intelligently optimized, and responsive to various situations.

In some implementations, users can be displayed on the map, for example, as nodes, icons, or in another manner to demonstrate their status and other variables. In some implementations, additional information of each user (e.g., a user's location, status, and photo, with directional vectors showing their movements) can be shown, for example, in real time or upon request (e.g., upon a click on an icon of the user). In some implementations, migrations or moving trends of the users can be tracked, for example, as the adjusters chase storms moving to heavily-impacted areas. As an example, if a hurricane makes landfall in Biloxi, Miss., push notifications can be sent to users (e.g., all Mississippi-licensed users) indicating possible claim assignments in that area. The migrations or moving trends of users can be unique to the individual users or of a small or large scale associated with two or more users. The adjuster management system 110 can detect, identify, monitor, record, store, and analyze the location data, patterns, trends, and forecasts of migrations or movements of the users, as well as external information such as traffic patterns, weather patterns, and other information that may affect future availability and/or timing, among others. The adjuster management system 110 can report, render, display, or otherwise communicate migrations and/or the moving trends to other systems and/or entities (e.g., to client systems, admins, and/or users.

In some implementations, the components of system 100 can include and/or provide safety features. For example, the adjuster management system 110 can send a push notification to the user device 120 of the user if the user is on an assignment and has not completed the assignment for a period of time longer than would be expected to complete the assignment task(s). The application can detect that the user is not active on the app for such a period of time. When the push notification pops up on the user device 120, the user can click a button to dismiss the notification which would notify the adjuster management system 110 that the user is still working on the assignment. If the user is unable to dismiss the notification (for example, because of injury due to falling off a ladder, or incapacitation due to an altercation with a customer, etc.), the adjuster management system 110 may notify emergency authorities and provide the location of the user device 120 obtained by the device GPS 124 and/or the location of loss 314 to facilitate the emergency authorities to locate the user. In some implementations, the system 100 and its components can utilize sensory or environmental data functionalities of a user device 120 to detect falls, arguments, loud sounds, sound signatures, recognizable voice or sound data, or other incidents or situations and the adjuster management system 110 can interact with users or other entities to identify, report, store, and/or communicate these incidents or situations with the user or other systems or entities. For example, the user device 120 can detect vibrations consistent with fall impact of the user and transmit that detection to the adjuster management system 110. The adjuster management system 110 can then be prompted to communicate with the user to determine if the user needs emergency assistance or if the detected incident may be dismissed. In this example, if the user needs emergency assistance or is unresponsive, the system 100 and its components can use features and functionality of the user device 120 and/or an alternative communication channel to communicate with and/or dispatch emergency services personnel to the user's or user device's location. In some implementations, the functionalities of the user device 120 can be utilized by the user application 122 to record audio, video, location information, and other data while a user is working on an assignment. For example, when a user accepts an assignment, their device 120 may record assignment-related discussions with customers. For example, the recordings may be used by trainers to improve training or customer service, as well as to document instructions and/or discussions with customers and other stakeholders.

In some implementations, the system 100 and its components can provide or include additional or different functionalities. For example, the adjuster management system 110 can generate, collect, or pull information (e.g., from one or more clients) to provide features such as employment, payroll, employee benefits, etc. of the users. In some implementations, the adjuster management system 110 can serve as, include, or be associated with a social media platform processing information, data, files, and user data between users and other entities. In some implementations, the system 100 and its components can host or be associated with useful tools (e.g., a dashboard or toolbox) allowing users to select and use various helpful resources of information, links, messages, videos, instructional displays, tutorials, message boards, forums, public postings, chatrooms, product identifiers, policies, lists, databases, some or all of which may be searched, filtered, and/or cross-referenced for ease of access, as well as interactive and/or live between users, admins, clients, customers, or other entities.

In some implementations, the adjuster management system 110 can serve as a client server and/or database to store data related to assignments, including the assignment itself and data related to the handling of the assignment, such as photos taken at an inspection at the loss location, recordings taken with various parties, documents, notes, payment information, claim-related information, reports, spreadsheets, letters, etc., some or all of which may be stored or collected for user, admin, or client access and/or review. For example, some clients may want to use services provided by the system 110, but may not have sophisticated software to warehouse all of the data used to perform their assignments. In such instances, the system 110 and/or related components or storage locations can be used to store this data for clients allowing them to access the data and review assignment information when needed.

In some implementations, the system 110 (or other related components) can provide functionality to allow users to post questions to be answered by peers, trainers, supervisors, admins, legal counselors, or other parties with varying degrees of authority. For example, a user can post a question about how much waste to use on a gable roof. The system 110 can post this question to one or numerous other users until a sufficient answer is provided (e.g., until the user accepts the provided answer(s) or a termination condition such as a percentage or frequency of consistent responses yields a sufficiently demonstrated response). The same or other functionality could be implemented to identify types of products by allowing the user to attach a photo, and could include a visual search or crowd-sourced analysis. The same or other functionality could be called "Ask a Trainer" or "Ask a Friend." The same or other functionality could also be used to facilitate shared knowledge and peer-to-peer training. The same or other functionality could collect and store data obtained during the posting/response(s) event to substantiate the accuracy of the provided response. The same or other functionality could allow the system 100 and its components to remember frequently asked questions and provide the previously demonstrated response without conducting the question posting process. The same or other functionality could be reverse engineered to identify training needs of users who provide conflicting responses.

In some implementations, the system 100 and its components can provide functionality to display advertisements (e.g., as pop-up or banner ads) to its users and/or clients either to promote products and/or services or to generate monetary revenue. In some implementations, the system 100 can link to or associate with other or third party services, systems, software, hardware, and/or applications to share or provide additional functionalities not native to the described adjuster management system 100, including those determined to be relevant to a particular assignment, assignment type, or user (e.g., location, etc.). In some implementations, the system 100 and its components can provide functionality which allows users, clients, etc., to benefit from quantities of scale and/or their assemblage (e.g., products or services offered for sale at a discount via the application due to the volume of users expected to make a purchase). In this scenario, the users represent a form of buying group to further benefit from the application. The same or similar functionality could also be utilized to unionize the workers, users, etc.

In some implementations, the system 100 and its components can provide technical support to users, clients, admins, etc. In some implementations, the system 100 and its components can install updates either automatically or after prompting users.

In some implementations, the system 100 and its components can track, accumulate, and store the mileage driven to assignments, for other assignment-related reasons, or for other reasons by users for later review for tax or other purposes.

In some implementations, the system 100 and its components can track and log the hours being worked by users to monitor overtime and regulate the assignments being offered to the user to optimize their hours worked in relation to the availability of other users for the assignments. For example, if individual "A" has logged the maximum hours and is now working overtime, but individual "B" is available and has worked less than the maximum hours, the system 100 and its components can, where other determination factors are similar, offer the assignment to individual "B" and not individual "A," or at a higher priority to individual "B." If another assignment becomes available and only individual "A" can work it, the system may allow individual "A" to continue working overtime if allowable by labor laws.

In some implementations, the system 100 and its components may include and/or incorporate wearable technologies including but not limited to body cameras, hat cameras, mountable hardware, sensors, microphones, earpieces, headsets, glasses, etc. In some instances, those technologies may be linked or connected to the user device 120, while in other instances those technologies may directly communicate with the system 100 and its components, such as the adjuster management system 110.

In some implementations, the system 100 and its components may include simulations, simulators, games, seminars, conferences, or other self-study or interactive experiences for educational, entertainment, or other purposes.

In some implementations, the system 100 and its components may include in-app purchases for such items including but not limited to games, credits, licenses, certifications, admission to training and/or study materials, conference registrations, other goods, services, and/or credentials, etc.

While various components, such as adjuster management system 110, may be described as performing particular actions or operations, any suitable component may perform similar operations, including but not limited to other components illustrated in FIG. 1 as well as alternative and/or additional components included in a different implementation or instance. Additionally, operations associated with system 100 herein can be performed by a single component, a combination of illustrated and/or non-illustrated components, or any other suitable technology or components.

Figure 4:
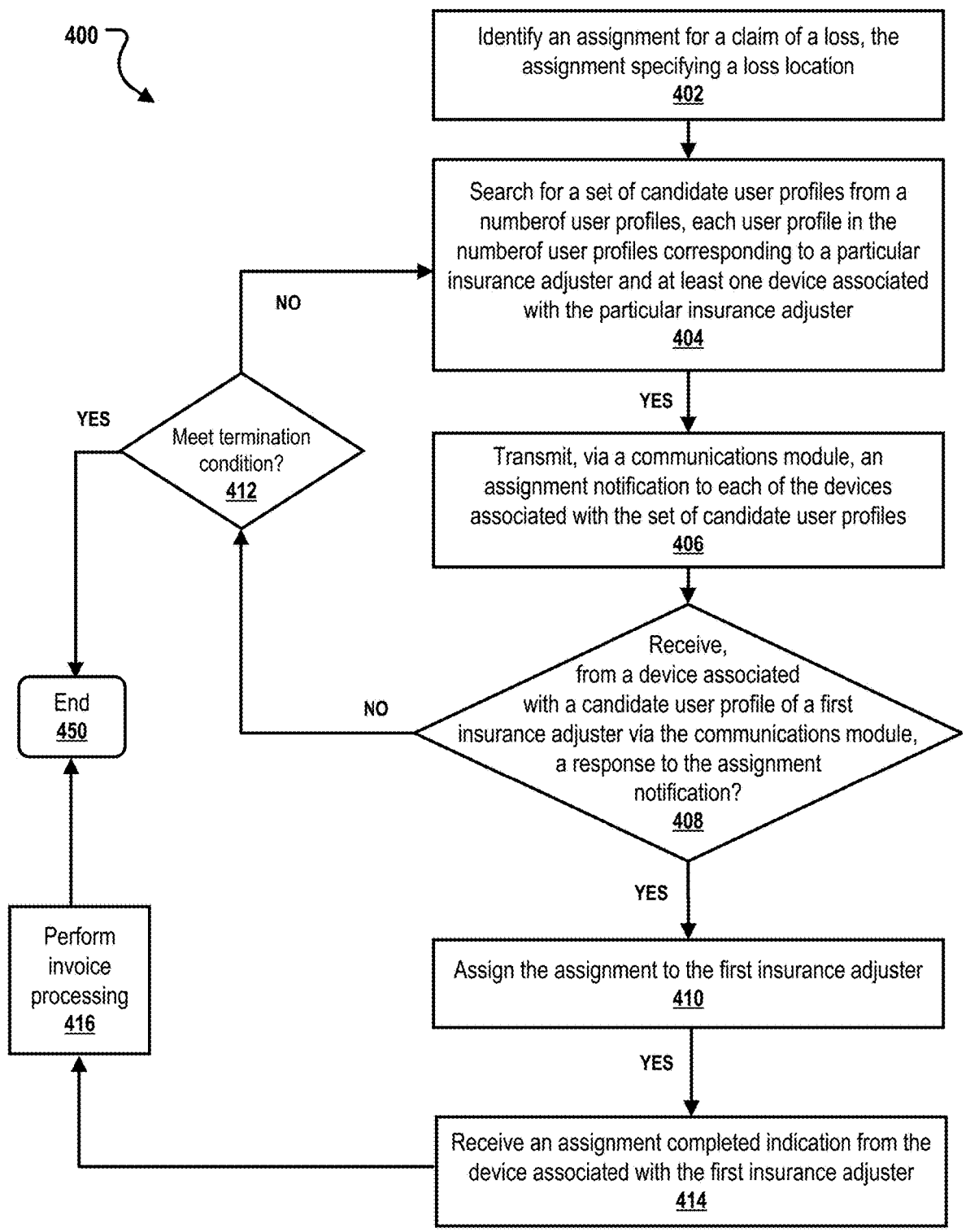
FIG. 4 is a flowchart illustrating an example of a method for assigning insurance adjusters for claim-handling services, according to an implementation of the present disclosure.

FIG. 4 is a flowchart illustrating an example of a method 400 for assigning insurance adjusters for claim-handling services, according to an implementation of the present disclosure. For clarity of presentation, the description that follows generally describes method 400 in the context of the other figures in this description. For example, the method 400 can be performed by the adjuster management system 110 in FIG. 1 or another data processing apparatus. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, an assignment for an insurance claim of a loss is identified. The assignment specifies a loss location. The insurance claim can be filed by an insurance policyholder of an insurance company. The loss location can be a location of the loss specified in the insurance claim (e.g., a home address of a policyholder). The loss location can be specified as an address, for example, in terms of one or more of a state, a municipality, a region, a street, a unit, etc. or in another format (e.g., latitude and longitude).

In some implementations, the assignment further specifies an assignment requirement, wherein the assignment requirement includes one or more of a loss type, a required equipment, or a required type of skill for the loss. In some implementations, the loss type for the loss includes one or more of a residential, commercial, farm/ranch, condominium master policy, marine, auto, wind, hail, back-up of sewer/drain, flood, fire, hurricane, earthquake, theft, or collision. For example, the loss type can be specified as one or more of a policy type that includes residential, commercial, farm/ranch, condominium master policy, flood, marine, and auto. In some implementations, the loss type can also include further information about specific issues, such as a wind, hail, back-up of sewer/drain, flood, fire, hurricane, earthquake, theft, collision, comprehensive (e.g., a combination of some or other types), etc. In some implementations, the required equipment for the loss can include a 32' ladder, 40' ladder, rope and harness, etc. In some implementations, the required type of skill for the loss can include one or more specific skills required based on a type of loss, a demand of the industry, or a specification by a client or the policyholder of the insurance claim. For example, the skills specified for an appraisal, surveying, inspection, public adjusting, or engineering assignment may be partially or completely different than the skills specified for an adjusting assignment. Functionality and operations for specifically identifying or specifying custom skill sets which accommodate the demands of each of the assignment types, or alternatively, for each specific assignment, can be provided and included in or associated with 402.

In some implementations, the insurance claim of the loss is created by a client system of an insurance company (e.g., the client system 130 in FIG. 1), and identifying an assignment for a loss includes receiving the insurance claim of the loss created by the client system of the insurance company. In some implementations, the insurance claim of the loss is created, for example, by the adjuster management system 110 in FIG. 1. For example, identifying an assignment for a loss includes receiving information of the insurance claim of the loss (e.g., the loss location, the loss type, the required equipment, or the desired type of skill for the loss) from an insurance company; and creating the assignment for the insurance claim of the loss based on the information about the insurance claim of the loss. From 402, method 400 proceeds to 404.

At 404, a set of candidate user profiles from a number of user profiles is searched for. Each user profile in the number of user profiles corresponds to a particular insurance adjuster and at least one device associated with the particular insurance adjuster. The set of candidate user profiles can be a first set of candidate user profiles. In some implementations, searching for the first set of candidate user profiles includes determining that a location associated with the at least one device associated with the particular insurance adjuster is within a first search range of the loss location; and identifying the user profile corresponding to the at least one device having the location within the first search range of the loss location as one of the first set of candidate user profiles.

In some implementations, searching for a first set of candidate user profiles of insurance adjusters based on the loss location and respective locations of devices associated with the first set of candidate user profiles includes receiving the respective locations of devices associated with the first set of candidate user profiles; identifying respective distances from the loss location to each of the respective locations of devices associated with the first set of candidate user profiles; and determining that the locations of devices associated with the first set of candidate user profiles are within the first search range of the loss location based on the respective distances from the loss location to the each of the respective locations of devices associated with the first set of candidate user profiles.

In some implementations, the respective locations of the devices are determined by receiving location information associated with the devices on a periodic basis. In some implementations, the respective locations of the devices are determined by transmitting a request for a current location to the devices and receiving location information associated with the devices in response to the request. In some implementations, the location information associated with a device can include a past location, a current location (e.g., determined by a GPS of the device, such as GPS 124 of device 120 in FIG. 1) or an expected-to-be location (e.g., determined from a calendar of the user, a moving speed and direction of the device, or based on information associated with a home base, office, or home of the user). In some instances, the system 100 can provide functionality to utilize the GPS 124 of the user device 120 to identify and/or mark location points on surveying assignments. Different types of assignments may identify different relevant locations for the particular assignment, and can use those locations as the relevant locations for assignment purposes as they relate to particular user devices.

In some implementations, searching for a first set of candidate user profiles based on the loss location and respective locations of devices associated with the first set of candidate user profiles includes: searching for a second set of user profiles that meet the assignment requirement; and searching for, from the second set of user profiles, the first set of candidate user profiles based on the loss location and respective locations of devices associated with the second set of candidate user profiles. The first set of candidate user profiles is a subset of the second set of candidate user profiles. From 404, method 400 proceeds to 406.

At 406, an assignment notification is transmitted, via a communications module (e.g., the interface 112 in FIG. 1), to each of the devices associated with the first set of candidate user profiles. In some implementations, the assignment notification specifies a distance from the loss location to a location of each of the devices associated with the first set of candidate user profiles. From 406, method 400 proceeds to 408.

At 408, a determination is made as to whether a response to the assignment notification is received from a device associated with a candidate user profile of a first insurance adjuster via the communications module. If it is determined that a response to the assignment notification is received from a device associated with a candidate user profile of a first insurance adjuster, method 400 proceeds to 410. Otherwise, if it is determined that no response to the assignment notification is received from a device associated with a candidate user profile of a first insurance adjuster, method 400 proceeds to 412.

In some implementations, the determination of receiving, from a device associated with a candidate user profile of a first insurance adjuster, a response to the assignment notification includes determining that receiving, from the device associated with the candidate user profile of the first insurance adjuster, the response to the assignment notification within a predetermined time period. In some implementations, determining that no response to the assignment notification is received includes determining that no response to the assignment notification has been accepted within a predetermined time period. In some implementations, the time period can be a fixed or configurable value. In some implementations, the time period can be dynamically set based on particular information about the claim. For example, the time period for a more detailed/difficult claim may be set to be longer for the user's reading/consideration before he/she decides to accept the assignment. In some instances, the time periods may differ from one radius to another, such as providing a relatively shorter time for closer adjusters to respond after a first notification, while a second notification at a larger radius may be a slightly longer time relative to the time after the first notification.

At 410, the assignment is assigned to the first insurance adjuster. In some implementations, assigning the assignment to the first insurance adjuster includes transmitting a confirmation to the device associated with the first insurance adjuster, and transmitting other confirmation and information about the candidate user profile of the first insurance adjuster to other devices and/or systems (e.g., the client system 130 in FIG. 1 associated with an insurance company to which the claim assignment belongs). From 410, method 400 proceeds to 414.

At 412, a determination is made as to whether a termination condition is met. If it is determined that the termination condition is met, method 400 proceeds to 450 where method 400 stops. Otherwise, if it is determined that the termination condition is not met, method 400 proceeds to 404 to search for another set of candidate user profiles from the number of user profiles. In some implementations, the termination condition can include a maximum number of searches (e.g., up to four searches), a maximum search radius (e.g., up to a search radius of 100 miles), a maximum accumulative search time (e.g., up to five minutes from the creation of the assignment), or any other conditions.

In some implementations, in searching for another set of candidate user profiles from the number of user profiles at 104, the first search range is expanded into a second search range. Another set of candidate user profiles is searched for based on the loss location and respective locations of devices associated with the another set of candidate user profiles, wherein the locations of devices associated with the first set of candidate user profiles are within the second search range of the loss location. From 404, method 400 proceeds to 406 to transmit an assignment notification to each of the devices associated with another set of candidate user profiles.

In some implementations, another set of candidate user profiles includes the first set of candidate user profiles so that the users corresponding to the first set of candidate user profiles have an additional chance or more time to accept the assignment because they may be located closer to the loss location than other users that are further away from the loss location (for example, the insurance adjusters with devices located outside the first search range, but within the second search range of the loss location).

At 414, an assignment completed indication is received from the device associated with the first insurance adjuster. The assignment completed indication can be an indication transmitted by the device associated with the first insurance adjuster after the first insurance adjuster completes the claim assignment. From 414, method 400 proceeds to 416.

At 416, invoice processing is performed. For example, an invoice can be generated on behalf of the first insurance adjuster based on an invoice questionnaire according to the example invoice processing techniques described above. The generated invoice can be transmitted to another device or system (e.g., the client system 130 in FIG. 1 associated with the insurance company to which the claim assignment belongs). From 416, method 400 proceeds to 450 where method 400 stops.

Figure 5:
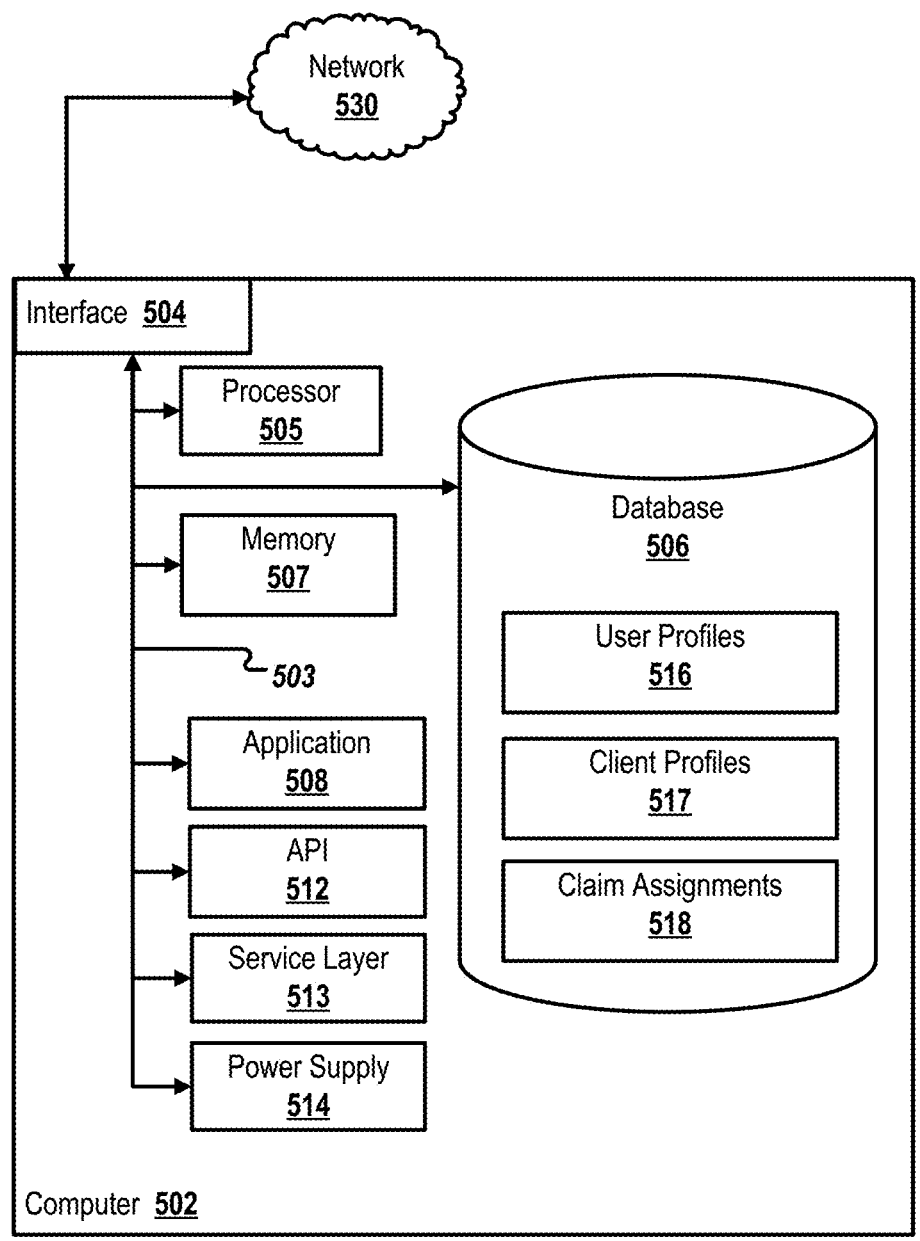
FIG. 5 is a block diagram illustrating an example of a computer system used to provide computational functionalities associated with described algorithms, methods, functions, processes, flows, and procedures, according to an implementation of the present disclosure.

FIG. 5 is a block diagram illustrating an example of a computer system 500 used to provide computational functionalities associated with described algorithms, methods, functions, processes, flows, and procedures, according to an implementation of the present disclosure. The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can include a computer that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a computer system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and includes logic encoded in software, hardware, or a combination of software and hardware. More specifically, the interface 504 can include software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds the previously described data for user profiles 516, client profiles 517, and claim assignments 518.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that, one user can use one computer 502, that many users can use one computer 502, or that one user can use multiple computers 502.

The following detailed description describes assigning users (e.g., insurance adjusters) for claim-handling or other insurance industry services, as well as user assignment outside of the insurance industry, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Described implementations of the subject matter can include one or more features, alone or in combination. In one implementation, an assignment for an insurance claim of a loss is identified, where the assignment specifies a loss location. A first set of candidate user profiles are searched for from a plurality of user profiles, where each user profile in the plurality of user profiles corresponds to a particular insurance adjuster and at least one device associated with the particular insurance adjuster. Searching for the first set of candidate user profiles can include determining that a location associated with the at least one device associated with the particular insurance adjuster is within a first search range of the loss location, and identifying the user profile corresponding to the at least one device having the location within the first search range of the loss location as one of the first set of candidate user profiles. An assignment notification is transmitted to each of the devices associated with the first set of candidate user profiles, such as by using a communications module. In response to receiving a response to the assignment notification from a device associated with a candidate user profile of a first insurance adjuster, the assignment is assigned to the first insurance adjuster.

In some instances, identifying the assignment for a loss can include receiving information about the insurance claim of the loss from an insurance company and creating the assignment for the insurance claim of the loss based on the information about the insurance claim of the loss.

In some instances, searching for a first set of candidate user profiles of insurance adjusters based on the loss location and respective locations of devices associated with the first set of candidate user profiles can include receiving the respective locations of devices associated with the first set of candidate user profiles, identifying respective distances from the loss location to each of the respective locations of devices associated with the first set of candidate user profiles, and determining that the locations of devices associated with the first set of candidate user profiles are within the first search range of the loss location based on the respective distances from the loss location to the each of the respective locations of devices associated with the first set of candidate user profiles. In some of those instances, the respective locations of the devices are determined by receiving location information associated with the devices on a periodic basis. In some instances, the respective locations of the devices are determined by transmitting a request for a current location to the devices and receiving location information associated with the devices in response to the request.

In some instances, the assignment notification specifies a distance from the loss location to a location of each of the devices associated with the first set of candidate user profiles. In other instances, the assignment notification specifies a determined time of arrival at or a determined time to travel to the loss location for each of the devices associated with the first set of candidate user profiles.

In some instances, the assignment specifies an assignment requirement, wherein the assignment requirement comprises one or more of a loss type, a required equipment, or a desired type of skill for the loss. In some of those instances, the loss type for the loss comprises one or more of a residential, commercial, farm/ranch, condominium master policy, marine, auto, wind, hail, back-up of sewer/drain, flood, fire, hurricane, earthquake, theft, or collision. In some instances, searching for a first set of candidate user profiles based on the loss location and respective locations of devices associated with the first set of candidate user profiles can include searching for a second set of candidate user profiles that meet the assignment requirement and searching for, from the second set of candidate user profiles, the first set of candidate user profiles based on the loss location and respective locations of devices associated with the second set of candidate user profiles.

In some instances, receiving, from the device associated with a candidate user profile of a first insurance adjuster, the response to the assignment notification can include receiving, from the device associated with the candidate user profile of the first insurance adjuster, the response to the assignment notification within a predetermined time period. In some instances, in response to determining that no response to the assignment notification has been accepted within a predetermined time period, the first search range can be expanded into a second search range. In those instances, another set of candidate user profiles can be searched for based on the loss location and respective locations of devices associated with the another set of candidate user profiles, wherein the locations of devices associated with the first set of candidate user profiles are within the second search range of the loss location. An assignment notification can then be transmitted to each of the devices associated with the another set of candidate user profiles. In some of those instances, the another set of candidate user profiles can include the first set of candidate user profiles.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus.

Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display of) data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    receiving, over a communications network via a communications module, location update messages from a plurality of mobile devices, each location update message including a current location of a sending mobile device from the plurality of mobile devices, wherein each mobile device is associated with a particular insurance adjuster, and wherein the current location of the sending mobile device corresponds to a current location of the associated insurance adjuster;
    for each received location update message, updating, in a data store, a current location in a user profile corresponding to the particular insurance adjuster associated with the sending mobile device based on the current location from the location update message;
    creating an assignment for an insurance claim of a loss, the assignment specifying a loss location and an assignment requirement;
    identifying, in the data store from a plurality of user profiles, a first set of candidate user profiles based on the loss location and the assignment requirement, wherein identifying the first set of candidate user profiles comprises:
        identifying a second set of candidate user profiles that meet the assignment requirement from the plurality of user profiles;
        identifying respective distances for each of the second set of candidate user profiles from the loss location to a current location in each of the second set of candidate user profiles stored in the data store from the location update message; and
        determining, from the second set of candidate user profiles, the first set of candidate user profiles as user profiles with respective distances within a first search range of the loss location;
    transmitting, via the communications module, an assignment notification to each of the mobile devices associated with the first set of candidate user profiles;
    initializing a countdown timer starting at a first timer value;
    in response to determining that no response to the assignment notification has been accepted at the expiration of the countdown timer,
        identifying a second search range, larger than the first search range;
        identifying a third set of candidate user profiles based on the loss location and respective current locations associated with the third set of candidate user profiles, wherein the current locations associated with the third set of candidate user profiles are within the second search range of the loss location;
        transmitting an assignment notification to each of the mobile devices associated with the third set of candidate user profiles; and
        initializing the countdown timer starting a second timer value;
    in response to receiving a response to the assignment notification from a mobile device associated with a candidate user profile of a first insurance adjuster via the communications module before the expiration of the second time value, assigning the assignment to the first insurance adjuster.

2. The computer-implemented method of claim 1, wherein identifying an assignment for a loss comprises:
    receiving information about the insurance claim of the loss from an insurance company; and
    creating the assignment for the insurance claim of the loss based on the information about the insurance claim of the loss.

3. The computer-implemented method of claim 1, wherein the location update messages are received from the mobile devices on a periodic basis.

4. The computer-implemented method of claim 1, wherein the location update messages are received from the mobile devices in response to a transmitted request for a current location.

5. The computer-implemented method of claim 1, wherein the assignment notification specifies a distance from the loss location to a current location in each of the first set of candidate user profiles.

6. The computer-implemented method of claim 1, wherein the assignment notification specifies a determined time of arrival at or a determined time to travel to the loss location for an insurance adjuster associated with each of the first set of candidate user profiles.

7. The computer-implemented method of claim 1, wherein the assignment requirement comprises one or more of a loss type, a required equipment, or a desired type of skill for the loss.

8. The computer-implemented method of claim 7, wherein the loss type for the loss comprises one or more of a residential, homeowner's, commercial, renter's, rental dwelling, farm/ranch, condominium master policy, marine, auto, wind, hail, back-up of sewer/drain, flood, fire, hurricane, earthquake, theft, business interruption, collision, or comprehensive.

9. The computer-implemented method of claim 1, wherein receiving, from a mobile device associated with a candidate user profile of a first insurance adjuster, a response to the assignment notification comprises receiving, from the mobile device associated with the candidate user profile of the first insurance adjuster, the response to the assignment notification within a predetermined time period.

10. The computer-implemented method of claim 1, wherein the another set of candidate user profiles comprises the first set of candidate user profiles.

11. The computer-implemented method of claim 1, further comprising adjusting the assignment requirement if a candidate user profile is not found after the expiration of the second timer value.

12. A non-transitory, computer-readable medium storing one or more instructions executable by a computer system to perform operations comprising:
receiving, over a communications network via a communications module, location update messages from a plurality of mobile devices, each location update message including a current location of a sending mobile device from the plurality of mobile devices, wherein each mobile device is associated with a particular insurance adjuster, and wherein the current location of the sending mobile device corresponds to a current location of the associated insurance adjuster;
for each received location update message, updating, in a data store, a current location in a user profile corresponding to the particular insurance adjuster associated with the sending mobile device based on the current location from the location update message;
creating an assignment for an insurance claim of a loss, the assignment specifying a loss location and an assignment requirement;
identifying, in the data store from a plurality of user profiles, a first set of candidate user profiles based on the loss location and the assignment requirement, wherein identifying the first set of candidate user profiles comprises:
identifying a second set of candidate user profiles that meet the assignment requirement from the plurality of user profiles;
identifying respective distances for each of the second set of candidate user profiles from the loss location to a current location in each of the second set of candidate user profiles stored in the data store from the location update message; and
determining, from the second set of candidate user profiles, the first set of candidate user profiles as user profiles with respective distances within a first search range of the loss location;
transmitting, via the communications module, an assignment notification to each of the mobile devices associated with the first set of candidate user profiles;
initializing a countdown timer starting at a first timer value;
in response to determining that no response to the assignment notification has been accepted at the expiration of the countdown timer,
identifying a second search range, larger than the first search range;
identifying a third set of candidate user profiles based on the loss location and respective current locations associated with the third set of candidate user profiles, wherein the current locations associated with the third set of candidate user profiles are within the second search range of the loss location;
transmitting an assignment notification to each of the mobile devices associated with the third set of candidate user profiles; and
initializing the countdown timer starting a second timer value;
in response to receiving a response to the assignment notification from a mobile device associated with a candidate user profile of a first insurance adjuster via the communications module before the expiration of the second time value, assigning the assignment to the first insurance adjuster.

13. The computer-readable medium of claim 12, wherein the current locations of the devices are determined by at least one of:
receiving the location update messages from the mobile devices on a periodic basis; and
transmitting a request for a current location to the mobile devices and receiving the location update messages from the mobile devices in response to the request.

14. The computer-readable medium of claim 12, wherein the assignment notification specifies at least one of:
a distance from the loss location to a current location associated with the first set of candidate user profiles; and
a determined time of arrival at or a determined time to travel to the loss location for an insurance adjuster associated with each of the first set of candidate user profiles.

15. The computer-readable medium of claim 12, wherein the assignment requirement comprises one or more of a loss type, a required equipment, or a desired type of skill for the loss.

16. The computer-readable medium of claim 12, further comprising adjusting the assignment requirement if a candidate user profile is not found after the expiration of the second timer value.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

receiving, over a communications network via a communications module, location update messages from a plurality of mobile devices, each location update message including a current location of a sending mobile device from the plurality of mobile devices, wherein each mobile device is associated with a particular insurance adjuster, and wherein the current location of the sending mobile device corresponds to a current location of the associated insurance adjuster;

for each received location update message, updating, in a data store, a current location in a user profile corresponding to the particular insurance adjuster associated with the sending mobile device based on the current location from the location update message;

creating an assignment for an insurance claim of a loss, the assignment specifying a loss location and an assignment requirement;

identifying, in the data store from a plurality of user profiles, a first set of candidate user profiles based on the loss location and the assignment requirement, wherein identifying the first set of candidate user profiles comprises:

identifying a second set of candidate user profiles that meet the assignment requirement from the plurality of user profiles;

identifying respective distances for each of the second set of candidate user profiles from the loss location to a current location in each of the second set of candidate user profiles; and determining, from the second set of candidate user profiles, the first set of candidate user profiles as user profiles with respective distances within a first search range of the loss location;

transmitting, via the communications module, an assignment notification to each of the mobile devices associated with the first set of candidate user profiles;

initializing a countdown timer starting at a first timer value;

in response to determining that no response to the assignment notification has been accepted at the expiration of the countdown timer, identifying a second search range, larger than the first search range;

identifying a third set of candidate user profiles based on the loss location and respective current locations associated with the third set of candidate user profiles, wherein the current locations associated with the third set of candidate user profiles are within the second search range of the loss location;

transmitting an assignment notification to each of the mobile devices associated with the third set of candidate user profiles; and initializing the countdown timer starting a second timer value;

in response to receiving a response to the assignment notification from a mobile device associated with a candidate user profile of a first insurance adjuster via the communications module before the expiration of the second time value, assigning the assignment to the first insurance adjuster.

18. The computer-implemented system of claim 17, wherein the location update messages are received from the mobile devices on a periodic basis.

19. The computer-implemented system of claim 17, wherein the location update messages are received from the mobile devices in response to a transmitted request for a current location.

20. The computer-implemented system of claim 17, further comprising adjusting the assignment requirement if a candidate user profile is not found after the expiration of the second timer value.

* * * * *